Patented Nov. 10, 1953

2,658,879

UNITED STATES PATENT OFFICE 2,658,879

ACRYLONITRILE POLYMERS DISSOLVED IN SOLVENT MIXTURES COMPRISING NITROMETHANE AND WATER

Ralph Gardner Beaman, Buffalo, N. Y., assignor to E. I. du Pont de Nemours & Company, Wilmington, Del., a corporation of Delaware No Drawing. Application August 19, 1948, Serial No. 45,197

20 Claims. (Cl. 260—29.6)

This invention relates to new compositions of matter and shaped articles produced therefrom. More particularly, this invention relates to solutions of polyacrylonitrile, i. e. polymerized acrylonitrile $(CH_2=CHCN)_x$, and copolymers and interpolymers of acrylonitrile in which at least 85% by weight of the polymer is acrylonitrile and to the production of shaped articles from said solutions of said polymers of acrylonitrile.

Polyacrylonitrile and copolymers and interpolymers of acrylonitrile with other polymerizable substances, for example vinyl or acrylic compounds, in which at least 85% by weight of the polymer is acrylonitrile have been known for some time and recognized as possessing desirable physical and chemical properties including toughness and insolubility in and insensitivity to common organic solvents such as water, methyl or ethyl alcohol, acetone, ethyl ether, ethyl acetate, hydrocarbon solvents, chlorinated hydrocarbons and the like. Because of these facts numerous attempts have been made to form these polymeric materials into yarns, films and other shaped articles. While a number of solvents have been developed for acrylonitrile polymers, additional solvents, and, in particular, low-boiling, inexpensive solvents, are desired to adapt the polymers to a wide variety of uses. The present invention represents a successful dissolution of these acrylonitrile polymers in a solvent to produce a solution which is suitable for the production of commercially useful textile yarns or wrapping tissue films and similar tough, flexible structures.

It has been known heretofore that concentrated aqueous solutions of inorganic salts such as lithium bromide, zinc chloride, and sodium sulfocyanide will dissolve polyacrylonitrile and it has been proposed (Rein U. S. Patent No. 2,140,921) to employ the resulting solutions in the formation of yarns and films. However, it has been found substantially impossible to use the resulting compositions in such a manner. Their extrusion into coagulating baths of the type proposed (including such non-solvents for polyacrylonitrile as water, dilute acid, dilute salt solutions, etc.) results in the formation of shaped articles that contain large amounts of the inorganic salt of the proposed solvent. These salts are distributed throughout the structure and destroy the continuity of the polyacrylonitrile phase and the structure possesses poor physical properties. Removal of these salts, when possible, results in the formation of a porous, spongy, weak, undesirable structure that is very brittle and completely unsuited for use as a yarn or film. Moreover, when it is attempted to form a multi-filament yarn by extruding, for example the proposed aqueous sodium sulfocyanide/polyacrylonitrile composition, into a dilute acid bath, it is found that the individual filaments obtained stick together to form an essentially monofilament structure that is extremely brittle and cannot be bent or worked without breaking.

U. S. Patent No. 2,167,537 to Tobis points out that certain copolymers of acrylonitrile and an acrylic acid ester (those copolymers containing not more than 65% of acrylonitrile) are soluble in mixtures of organic solvents, such as dioxan, monochlorbenzene, cyclohexanone, etc. However, these liquids are incapable of dissolving or even swelling polyacrylonitrile or copolymers of acrylonitrile containing higher percentages of acrylonitrile, i. e. acrylonitrile polymers of the type with which this invention is concerned. As previously mentioned, polymers containing such high percentages (at least 85% by weight) of acrylonitrile are especially desirable for use because of their good physical properties and excellent chemical resistance.

It has also been proposed (Rein U. S. Patent No. 2,117,210) to dissolve polyacrylonitrile in molten quaternary ammonium salts such as benzyl pyridinium chloride, an ionizable salt. Although the resulting solution can allegedly be used to form yarns or films of polyacrylonitrile, the solution itself is dark red to brown in color, indicating that some decomposition of the polyacrylonitrile or some reaction between the polyacrylonitrile and the molten salt has probably taken place. Such solutions are not satisfactory for the production of commercially useful, shaped articles of polyacrylonitrile. Here again, it has been found practically impossible to obtain filamentary structures, such as yarns, from the compositions. Films or filaments, when obtainable, are extremely brittle; they are highly colored and very weak, presumably because of the presence within them of residual quaternary ammonium salt. Removal of this salt is difficult and the resulting structures contain numerous and large voids that make the structures substantially useless for commercial purposes.

It is therefore an object of this invention to dissolve polyacrylonitrile, or a copolymer or interpolymer of acrylonitrile in which at least 85% by weight of the polymer is acrylonitrile, in a solvent which does not react with or decompose the polymer and which may be substantially completely removed from structures formed of such a solution.

It is another object of this invention to produce a solution of polyacrylonitrile, or a copolymer or interpolymer of acrylonitrile in which at least 85% by weight of the polymer is acrylonitrile, in a low-boiling solvent which does not react with or decompose the polymer, the solution being suitable for the formation of commercially useful articles, for example yarns which are suitable as textile yarns and films which are suitable as wrapping tissues.

It is a further object of this invention to produce a solution of polyacrylonitrile, or a copolymer or interpolymer of acrylonitrile in which at least 85% by weight of the polymer is acrylonitrile, in a volatile solvent, which solution is stable over extended periods of time and is eminently suited for use in the manufacture of shaped articles such as yarns, films, tubes, straws, artificial horsehair, bristles and ribbons, or when highly concentrated, for use in the manufacture of molded articles.

It is a still further object of this invention to produce useful shaped articles and structures of polyacrylonitrile, or copolymers or interpolymers of acrylonitrile in which at least 85% by weight of the polymer is acrylonitrile.

It is still another object of this invention to produce a shaped article or structure of polyacrylonitrile, or copolymers or interpolymers of acrylonitrile in which at least 85% by weight of the polymer is acrylonitrile, for example a yarn, film, tube, bristle or the like which is tough, flexible, tenacious and free from voids.

Other objects of the invention will appear hereinafter.

The objects of this invention may be accomplished, in general, by dissolving polyacrylonitrile or a coplymer or interpolymer of acrylonitrile in which at least 85% by weight of the polymer is acrylonitrile in water-nitromethane mixtures. The solvent comprises from 55% to 96.5% by weight nitromethane and from 3.5% to 45% by weight water. For the homopolymer, it is preferred to use 6.5% to 45% water and 55% to 93.5% nitromethane. For copolymers, amounts of 3.5% to 45% water and 55% to 96.5% nitromethane are used.

Peculiarly, neither nitromethane nor water alone is a solvent for these polymers. The solvent mixtures have low boiling points (around 100° C.). This is exceedingly advantageous for it permits the ready and economic production of shaped articles by dry spinning techniques. Other methods, such as wet-spinning procedures are also used advantageously. In addition to being low-boiling, the novel solvents of this invention have the very important added advantages of being inexpensive, readily available and substantially non-toxic.

The following examples, in which parts, proportions and percentages are by weight, are given for illustrative purposes and are not to be construed as limitative:

Example I

A mixture containing 15 parts of polyacrylonitrile having a molecular weight of 70,000, 76.5 parts by weight of nitromethane and 8.5 parts by weight of water was stirred at 84° C. under reflux conditions. A clear solution formed readily. The viscosity of the solution at 90° C. was 24 poises. Upon cooling the solution gelled. The hot solution was extruded under a carbon dioxide pressure of about fifty pounds per square inch through an orifice 0.01 inch in diameter into a spinning bath consisting of water heated to a temperature of about 85° C. A monofilament formed readily and was collected at a speed of three and one-third yards per minute. The monofil obtained was substantially transparent and colorless and showed no porosity upon microscopic examination. It could be hot drawn readily; for example, at 100° C. it was drawn three times its original length to give a monofilament of having increased tenacity over the original. The product could be converted into useful products as, for example, into yarn.

In a similar experiment, a coplymer of acrylonitrile with 5% of 2-vinylpyridine (molecular weight of 84,000) was readily converted to a clear solution. This was wet-spun into a water bath at 72° C. to produce a dense monofilament which was lustrous and could be hot drawn readily.

Example II

A solution was prepared as described in Example I. This was placed in a press spinner which was heated to 85° C. The orifices in the spinneret were five in number and 0.20 mm. in diameter. A pressure of 100 pounds per square inch was exerted using carbon dioxide. Extrusion of the solution into air at room temperature occurred. The filaments so formed were lustrous and tough.

A similar experiment was conducted using a copolymer of acrylonitrile with 5% of 2-vinylpyridine. The filaments produced therefrom were well-formed and also were lustrous and tough.

Example III

Ten parts of polyacrylonitrile was dissolved in 90 parts by weight of a mixture of 101.8 parts by weight of nitromethane and 10 parts by weight of water by stirring and heating at 84° C. The resultant clear, viscous solution was cast on a smooth glass surface. The solvent was removed by heating at 100° C. A clear, transparent film remained. This film could be removed and used, for example, as a protective covering or coating.

Example IV

In a series of experiments, 10 parts by weight of each copolymer listed below was slurried with 95 parts by weight of nitromethane and heated to 85° C.

95/5—Acrylonitrile/styrene
95/5—Acrylonitrile/dimethylitaconate
95/5—Acrylonitrile/methyl vinyl ketone
95/5—Acrylonitrile/methacrylic acid
90/10—Acrylonitrile/ethyl vinyl sulfone
90/10—Acrylonitrile/methacrylonitrile
90/10—Acrylonitrile/methyl vinyl ketone
90/10—Acrylonitrile/isobutylene In each case, the addition of 6 parts by weight of water, while maintaining the temperature in the vicinity of 85° C., brought about the formation of a clear, viscous solution.

Example V

Five parts of polyacrylonitrile and 95 parts of a 45/55 water/nitromethane mixture were heated under pressure at 200° C. The clear, viscous solution formed could be used for preparing useful filaments. Similarly, at 115° C. a 29/71 water/nitromethane mixture was an effective solvent.

The amounts of water and nitromethane that are necessary for effective solvents depend upon such factors as temperature, pressure, type of polymer being dissolved, etc. Using a 96/4 by weight mixture of nitromethane and water no visible change occurred with polyacrylonitrile at temperatures up to 100° C. With 7% by weight water the polymer dissolved readily at 84° C. Lower amounts, such as 6.5% are also effective. In general, the copolymers or interpolymers of acrylonitrile containing at least 85% acrylonitrile are more easily dissolved than the homo polymer. Accordingly, these require less water. As little as 3.5% by weight water may be used in the solvent mixtures. Amounts of water as high as 45% are operable. The upper limit for water is that amount which is compatible with the nitromethane polymer system and this varies with the temperature (pressure) and with added ingredients, if any. In general, 3.5% to 45% by weight water is used satisfactorily with 55% to 96.5% by weight nitromethane. The preferred amount of water in the preparation of solutions of polyacrylonitrile is about 7% to 12% and that for copolymer or interpolymers is about 3.5% to 12%.

The solvent mixtures of this invention are miscible in a wide range of proportions with polyacrylonitrile and copolymers and interpolymers of acrylonitrile. They are stable at the elevated temperatures employed and they do not appear to react with nor decompose the polymers. The solvent mixtures are also miscible with (soluble in) such non-solvent liquids for the polymeric materials as water, aqueous salt solutions, alcohol, glycerol, etc. Solutions of an acrylonitrile polymer in many of the solvent mixtures of this invention can therefore be extruded into excess amounts of such liquids to form shaped articles such as yarns, films, etc. of the polymer, with the solvent being removed by selective solution in the liquid coagulant. Moreover, because the solvents of the invention are volatile (vaporizable without decomposition at atmospheric pressure and at temperatures not exceeding 105° C.), solutions of the polymer in the solvents are eminently suited for use in a dry spinning or casting process for the preparation of a yarn or film of the polymer.

For the purpose of definition, a solvent is a material which, when in the liquid state, is capable of forming solutions in which the polymer is present in a concentration of 5% by weight or more. In most instances, the solvent and polymer are miscible in almost all proportions although the miscibility may take place at elevated temperatures in the case of certain polymers.

The solutions of the invention are preferably prepared by heating the polymer or copolymer or interpolymer with the solvent mixtures of this invention. Usually, they dissolve or retain the polymer in clear solution at elevated temperatures, for example at temperatures of 80° C. or higher, below which temperature the composition takes on the appearance of a gel. This phenomenon of gel formation or syneresis is reversible, however, and subsequent heating of the gelled or syneresed mass causes it to revert to solution form. However, certain solutions of the polymers as, for example, those of copolymers of acrylonitrile and vinyl pyridines in the solvents of this invention do not gel at low temperatures, as, for example, room temperatures.

Shaped articles obtained from solvent solutions of acrylonitrile polymer prepared in accordance with the invention and from which the solvent is subsequently removed are substantially free of foreign matter and voids after removal of the solvents, and the acrylonitrile polymer remains substantially undecomposed and chemically unchanged from the original acrylonitrile polymer prior to its solution.

The above-described solutions of acrylonitrile polymer may be shaped in the form of filaments, yarns, films, tubes and like structures by apparatus and processes generally known in the art, the detailed operating conditions being suitably modified.

Suitable methods and apparatus for the production of shaped articles of the polymers of this invention will be readily apparent by reference to such patents as U. S. 2,404,714 to 2,404,727. Any of the precedures and apparatus described therein can be used in this invention with but slight modifications, if any.

The polyacrylonitrile for use with this invention is preferably prepared by the ammonium persulfate catalyzed polymerization of monomeric acrylonitrile dissolved or emulsified in water. It can however be prepared by any other suitable type of polymerization reaction such as, for example, the emulsion type reaction disclosed by U. S. Patent No. 2,160,054 to Bauer et al. The polymer preferably possesses a molecular weight within the range of 15,000 to 250,000 or even higher, as calculated from viscosity measurements by the Staudinger equation:

$$\text{Molecular weight} = \frac{N_{sp}}{K_m C}$$

wherein:

$K_m = 1.5 \times 10^{-4}$ $N_{sp} = \text{specific viscosity} = \frac{\text{viscosity of solution}}{\text{viscosity of solvent}} - 1$ and $C$ = concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. For example, polyacrylonitrile having a molecular weight of approximately 60,000 can be prepared as follows: To 94 pounds of distilled water, heated to 40° C., add 40 grams of ammonium persulfate catalyst and 80 grams of sodium bisulfite activator. Then add 16 pounds of acrylonitrile slowly with stirring over a period of two hours. The polyacrylonitrile having the above-said molecular weight will precipitate from the solution. Increasing or decreasing the amount of the catalyst, while maintaining the other conditions constant, decreases or increases the molecular weight of the polymer. Acrylonitrile copolymers and interpolymers containing at least 85% by weight of acrylonitrile and likewise preferably possessing a molecular weight of 15,000 to 250,000 or higher can be prepared in a similar manner.

The solvents and processes of this invention are equally useful in forming clear, useful solutions of such acrylonitrile copolymers and interpolymers as were considered heretofore to be insoluble in volatile solvents, i. e. acrylonitrile copolymers and interpolymers containing at least 85% by weight of acrylonitrile. It is therefore considered to be within the scope of this invention to dissolve in the above-mentioned solvents copolymers and interpolymers in which acrylonitrile is copolymerized or interpolymerized with polymerizable substances such as, for example, compounds containing one or more ethylenic linkages, e. g. the vinyl pyridines, vinyl acetate, vinyl chloride, methacrylonitrile, acrylic acid and its esters and homologues such as methacrylic acid, dimethyl itaconate, methyl vinyl ketone, ethyl vinyl sulfone, styrene, isobutylene and butadiene, as well as other vinyl and acrylic compounds, other olefinic or diolefinic hydrocarbons, etc. and polymers of such substances. The solvent mixtures of the present invention are also useful as new solvents for acrylonitrile polymers which have less than 85% by weight of acrylonitrile and especially those having an average molecular weight of 15,000 to 250,000 as determined by viscosity data using the Staudinger equation and intended particularly for use in the manufacture of yarns and films.

The solution of acrylonitrile polymer dissolved in accordance with this invention must be of such a concentration that its viscosity at the operating temperature is within a workable range. When it is to be employed in the spinning of yarn or the casting of film, the solution should preferably have a viscosity within the range of 15 to 750 poises; when the polymer has a molecular weight of 250,000 or more, this requires that the maximum concentration of polymer in the spinning solution be of the order of 10%. Generally, it is preferred that the spinning solution contain at least about 10% of the polymer because of the difficulty of rapidly removing large amounts of solvent from the solution in the spinning operation. Moreover, it is economically undesirable to use such large amounts of solvent for the spinning of a given amount of polymer although it is true that the solvent can be completely recovered from the spinning operation and reused. For these reasons, it is preferred to employ a polymer having an average molecular weight of between 40,000 and 150,000 since such a polymer forms a solution of the desired viscosity in concentration of the order of 10% to 25% and at a desirable spinning temperature of the order of 70° C. to 100° C. Of course, it is within the scope of the invention to heat the solution to a higher temperature, even to above the normal boiling point of the solvent, for the actual spinning operation. Here again, the controlling factor with regard to the temperature of the spinning solution is the viscosity of the solution.

The evaporative medium employed in the dry spinning of filaments and yarns or the dry casting of films in accordance with this invention may be any vapor inert to the film- or filament-forming solution, such as air, nitrogen, steam, etc., or any suitable mixture thereof. The temperature of the evaporative medium is dependent on such factors as the dimensions of the spinning cell, the composition and rate of extrusion of the spinning solution and the rate of flow of the evaporative medium. It is only necessary that these several factors be so correlated that the yarn or other shaped article leaving the spinning cell be sufficiently freed of the solvent so that it is solidified and capable of being wound into package form or otherwise collected.

As indicated in Example I above, shaped articles of acrylonitrile polymer can also be formed by extruding the spinning solution into a suitable precipitating bath comprising a liquid that is miscible with the solvent but is a chemically inert non-solvent for the acrylonitrile polymer. As examples of such a liquid may be mentioned water, glycerin, organic solvents such as alcohol, ether, etc. or aqueous solutions of salts, alkalies or acids.

The length of travel of the shaped article through the precipitating or coagulating liquid is not critical to the invention, provided only that it be sufficiently long to solidify the acrylonitrile polymer. When the precipitating bath is water, the bath travel may be as short as ½ inch, or it may be 18 or more inches in length. When the precipitating liquid is an aqueous salt solution such as 20% solution of calcium chloride, the solidification of the acrylonitrile polymer structure is generally more gradual than in the case of water so that it is necessary to use a somewhat longer bath travel than with water. If desired, suitable means, such as guide rods or rollers may be placed in the bath to tension the yarn or other shaped article during its formation.

The article of acrylonitrile polymer thus obtained can advantageously be subjected to a stretching operation of the type employed in the above examples. This stretching is preferably performed by passing the yarn between two positively driven rollers, the peripheral speeds of which are so adjusted that the article is stretched to from two to ten times its original length, preferably approximately six times its original length. This stretching of the formed article may be performed at any suitable time. However, in the case of articles formed by the wet spinning or casting technique, it is preferably performed before the article has been completely dried. The orientation of the structure thus obtained greatly improves the physical properties of the structure, including its tenacity, its resilience, etc.

This stretching of the shaped article can also be accomplished by causing the article, while passing between stretching rollers, to contact a heated stationary pin, or to pass through an inert medium such as air, water, glycerin, etc. heated to a high temperature. Obviously, the article must not be exposed to this high temperature for a period sufficiently long to decompose the polymer. In general, however, the time of contact of the article with the heated medium is so short that temperatures up to 250° C. can be employed. Although it is generally preferred to heat the article to a temperature of at least 100° C. during the stretching operation, this is not essential. Desirable results can be obtained by stretching the article without the application of heat, for example by stretching at room temperature.

Although the discussion thus far has been directed mainly toward the manufacture of yarns and films of acrylonitrile polymer, the solutions provided by the invention and the evaporative and wet spinning processes described above are equally well adapted for use in the manufacture of other shaped articles of acrylonitrile polymer, such as artificial horsehair, straws, bristles, tubes, bands and ribbons. For example, the solutions may be extruded through a suitable die and into a heated atmosphere or precipitating bath to form a tubular structure, or they may be extruded in any other desired manner. While the dissolved products of this invention are homogeneous compositions of the acrylonitrile polymers and the nitromethane/water mixtures, the invention is not limited thereto. The above specified solvent mixtures may be used in amounts insufficient to dissolve the polymers. The smaller amounts cause the polymer particles to swell and this effect is useful, as for example, in obtaining penetration into the filaments of such materials as dyes. Further, the polymers may be dissolved in the nitromethane/water mixtures and excess water may be added to the solutions in amounts insufficient to precipitate the polymer but sufficient to form a separate phase. Such compositions are useful in spinning procedures, producing satisfactory filaments.

This invention is primarily concerned with the steps of dissolving acrylonitrile polymer in a suitable solvent to form a stable solution adapted for use in the manufacture of shaped articles of acrylonitrile polymer. It is characteristic of the invention that the solutions provided by it are stable; i. e. the solvents do not cause a decomposition or chemical alteration of the dissolved acrylonitrile polymer. At the same time, it is also characteristic that the solvents provided by the invention are also useful in the dissolving of mixtures of acrylonitrile polymer and adjuvants such as dye modifiers or other polymers, which adjuvants may be incorporated in the polyacrylonitrile solution to modify the properties, both chemical and physical, of the resulting shaped articles.

The invention provides practical methods for preparing shaped articles of polymers of acrylonitrile having at least 85% by weight of acrylonitrile, which articles are characterized by desirable physical and chemical properties. For example, the articles are resistant to the action of water and the common organic solvents. They are not affected by prolonged contact with relatively concentrated solutions of sulfuric acid, or other mineral acid, nor are they affected by dry cleaning solvents, etc. They differ from articles of other polymerized vinyl compounds, such as polymerized vinyl chloride, in that they do not shrink greatly when heated to high temperatures. They possess a desirable high dielectric strength and are not harmed by prolonged exposure to ultraviolet light. They are also very resistant to the action of mold and bacteria growth.

Yarns, films and similar articles of acrylonitrile polymer prepared in accordance with this invention can be stretched to yield oriented structures that possess a high tenacity, a desirable elongation, and a high elastic recovery that compares favorably with that of silk. The articles are not contaminated with undesirable salts and they are substantially free of void spaces. The films, tubings and similarly shaped articles are approximately sixteen times as impervious to the transmission of moisture vapor as are films, tubings, etc. of regenerated cellulose of the same thickness. They are substantially impervious to oils and hydrocarbons including aviation gasolines.

Because of these several unique properties which may be combined here in a single substance, acrylonitrile polymer articles produced in accordance with the principles of this invention find many important uses. While yarns made from these polymers are capable of use wherever yarns have previously been used with more or less advantage, there are certain fields where the properties of the polymer especially commend them. For example, the high tenacity, flexibility and resilience of the yarns of the invention make them suitable for use in the manufacture of hosiery and other articles of clothing while the resistance to soiling and ease of cleaning (common cleaning agents may be used on them without danger) make them desirable for use in flat fabrics, and either as multifilament or monofilament yarns in the manufacture of pile fabrics including velvets, plushes, upholstery or carpeting. The yarns can be advantageously used as either the pile and/or backing of such fabrics. At the same time, their low water absorption, high resistance to ultra-violet light make the yarns highly suited for use in outdoor fabrics such as tents, awnings, tarpaulins, flags, sails and the like. These same factors, taken together with the low density of the yarn (specific gravity of 1.16 as compared with 1.52 for cellulose), also permit the yarns to be manufactured into clothing and other articles for use in tropical climates where light weight, flexible fabrics that resist the action of weather, direct sunlight and mold growth are required. Other uses based on these same and related properties include the manufacture of the yarns into fishing lines, fish nets, cordage especially for marine purposes, bathing suits, umbrellas and the like. It is, of course, to be understood that the yarns of the invention can be employed in these uses in the form of either continuous filaments or as staple fibers of any given length. They can be formed into novelty yarns with other fibers, both natural and synthetic in character, and because of their high resilience, the staple fibers of the invention, particularly when crimped, are highly suited for admixture with wool.

Still other uses, particularly for monofilamentary structures of the ploymer, include the manufacture of rattan-like fabric for furniture, bristles and window screening wherein the light weight, low water absorption, and high resistance of the polymer to ultra-violet light, sulfur fumes and salt air are important attributes. Moreover, the high flexibility and durability of such structures enable screens made of them to be rolled up when not in use, thus permitting their incorporation as an integral part of the window structure.

As previously mentioned, the acrylonitrile polymers with which this invention is concerned are highly resistant to the action of acids and most other chemical reagents including oils, greases and the like and this fact, taken together with their high softening point and controlled shrinkage, makes yarns of the polymer highly useful in industrial applications including such uses as filter cloths, covers for rayon spinning bobbins and cakes, clothing for workers in areas where acids and other corrosive fumes are present and the like. Still another important use, dependent mainly on its resistance to acids, comprises the manufacture of the yarn or other shaped articles of the polymer including films and tubings into liners, separators or other protective parts for storage batteries, particularly of the heavy duty type.

The above uses are primarily concerned with yarns (either multifilamentary or monofilamentary in character) of the polymer. However, it will be understood that the same desirable properties (also present in other shaped articles of the polymer such as film, tubing and the like) make these other articles useful in similar applications such as the protection of objects from the effects of moisture, common organic solvents and chemical reagents and as containers or tubings for the packaging or transport of liquids including corrosive liquids, oils, greases and the like. Moreover, because of their clarity and brilliance, films of an acrylonitrile polymer prepared in accordance with this invention also find an important use in the decorative art.

The solutions prepared in accordance with the present invention are also suited for use as lacquers or coating compositions and are especially suitable for use in the coating of wire and electrical parts where the high chemical and electrical resistance of the polymer is important.

Reference, throughout the specification and claims, to acrylonitrile polymers, polymers of acrylonitrile, and copolymers and interpolymers of acrylonitrile "containing at least 85% by weight of acrylonitrile" signifies polymers containing in their molecules at least 85% by weight of the acrylonitrile unit which is considered to be present in the polymer molecule as the group

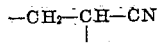

that is, at least 85% by weight of the reactant material converted into and forming the polymer is acrylonitrile.

It is possible to use the solvents of this invention in admixture with other known solvents or with non-solvents. For example, the solvents given in U. S. Patents 2,404,714–2,404,727 may be used in appropriate amounts in the solvent mixtures of this invention. However, for economy and simplicity, it is preferred to use the solvent mixtures alone.

The solvent mixtures of this invention are specific to nitromethane/water mixtures. A large number of other compounds have been tried instead of water without success. These include acetic acid, acetone, acetonitrile, benzene, carbon disulfide, carbon tetrachloride, chloroform, cyclohexane, dimethyl carbonate, dioxane, ethanol, ethylene glycol, n-heptane, methanol, methyl acetate, nitroethane, n-propanol, iso-propanol, phenol, thiophene and glycerine. These were tried in a wide variety of proportions.

Likewise, the following nitroalkanes cannot be substituted in entirety for nitromethane; nitroethane, 1-nitropropane and 2-nitropropane. A number of alcohols, including methanol, ethanol, n-propanol, iso-propanol and n-butanol were tried with nitroethane, 1-nitropropane and 2-nitropropane without success. It is, therefore, surprising that the nitromethane/water mixtures of this invention are solvents for acrylonitrile polymers. This is true, also, for the reasons that the polymers are hydrophobic and neither the nitromethane nor the water dissolve the polymers when used alone.

The volatility of the nitromethane/water mixtures coupled with their inexpensiveness makes them highly advantageous and useful in the commercialization of acrylonitrile polymers. Since nitrohydrocarbons can be made to detonate, care should be exercised in their use.

Any departure from the above description which conforms to the present invention is intended to be included within the scope of the claims.

I claim:

1. As a new composition of matter, a polymer of acrylonitrile containing in the polymer molecule at least 85% by weight of acrylonitrile dissolved in a solvent comprising a mixture of nitromethane and water.

2. A new composition of matter in accordance with claim 1 in which said polymer is polyacrylonitrile.

3. A new composition of matter in accordance with claim 1 in which said polymer is a copolymer.

4. A new composition of matter in accordance with claim 1 in which said polymer is a copolymer of acrylonitrile and a vinylpyridine.

5. A new composition of matter in accordance with claim 1 in which said polymer is a copolymer of acrylonitrile and 2-vinylpyridine.

6. A new composition of matter in accordance with claim 1 in which said polymer has a molecular weight between 15,000 and 250,000.

7. A new composition of matter in accordance with claim 1 in which said polymer has a molecular weight between 40,000 and 150,000.

8. A new composition of matter in accordance with claim 1 in which the solution has a viscosity within the range 15 to 750 poises.

9. A new composition of matter in accordance with claim 1 in which the solution contains at least 10% of said polymer.

10. As a new composition of matter a polymer of acrylonitrile containing in the polymer molecule at least 85% by weight of acrylonitrile dissolved in a mixture comprising 6.5% to 45% water and 55% to 93.5% nitromethane.

11. A new composition of matter in accordance with claim 10 in which the solution contains at least 10% of said polymer.

12. A new composition of matter in accordance with claim 10 in which said polymer has a molecular weight of between 15,000 and 250,000.

13. A new composition of matter in accordance with claim 10 in which said polymer has a molecular weight of between 40,000 and 150,000.

14. A new composition of matter in accordance with claim 10 in which the viscosity of the solution is within the range 15 to 750 poises.

15. As a new composition of matter polyacrylonitrile dissolved in a mixture comprising from 6.5% to 45% water and 55% to 93.5% nitromethane.

16. A composition of matter comprising a polymer of acrylonitrile containing in the polymer molecule more than 86% by weight of acrylonitrile, dissolved in a solvent comprising a mixture of a major amount of nitromethane and a minor amount of water.

17. A composition of matter comprising a polymer of acrylonitrile containing in the polymer molecule at least 85% by weight of acrylonitrile, dissolved in a solvent comprising a mixture of 96.5 to approximately 91.1% by weight of nitromethane and 3.5 to approximately 8.9% by weight of water.

18. As a new composition of matter a polymer of acrylonitrile containing in the polymer molecule at least 85% by weight of acrylonitrile dissolved in a mixture comprising 3.5% to 45% water and 55% to 96.5% nitromethane, the said polymer being a copolymer.

19. A composition of matter comprising polyacrylonitrile dissolved in a mixture comprising about 7% water and about 93% nitromethane.

20. As a new composition of matter, a polymer of acrylonitrile, containing in the polymer molecule at least 85% by weight of acrylonitrile, in admixture with a substance comprising 3.5% to 45% water and 55% to 96.5% nitromethane.

RALPH GARDNER BEAMAN.

References Cited in the file of this patent

UNITED STATES PATENTS

| Number | Name | Date |
| --- | --- | --- |
| 2,417,293 | D'Alelio | Mar. 11, 1947 |
| 2,417,294 | D'Alelio | Mar. 11, 1947 |
| 2,436,204 | D'Alelio | Feb. 17, 1948 |